(12) United States Patent
Imakurusu et al.

(10) Patent No.: US 9,969,017 B2
(45) Date of Patent: May 15, 2018

(54) WIRE SAW APPARATUS AND CUT-MACHINING METHOD

(71) Applicant: TOYO ADVANCED TECHNOLOGIES CO., LTD., Hiroshima-shi (JP)

(72) Inventors: Shoji Imakurusu, Hiroshima (JP); Toshimitsu Iwai, Hiroshima (JP); Jun Ohya, Hiroshima (JP); Masaru Fukuman, Hiroshima (JP)

(73) Assignee: Toyo Advanced Technologies Co., Ltd., Hiroshima (JP)

( * ) Notice: Subject to any disclaimer, the term of this patent is extended or adjusted under 35 U.S.C. 154(b) by 42 days.

(21) Appl. No.: 14/435,721

(22) PCT Filed: Oct. 15, 2012

(86) PCT No.: PCT/JP2012/006589
§ 371 (c)(1),
(2) Date: Apr. 14, 2015

(87) PCT Pub. No.: WO2014/061053
PCT Pub. Date: Apr. 24, 2014

(65) Prior Publication Data
US 2015/0290728 A1    Oct. 15, 2015

(51) Int. Cl.
*B23D 61/18* (2006.01)
*B23D 57/00* (2006.01)
(Continued)

(52) U.S. Cl.
CPC ....... *B23D 61/185* (2013.01); *B23D 57/0061* (2013.01); *B24B 27/0633* (2013.01); *B28D 5/045* (2013.01)

(58) Field of Classification Search
CPC .............. B23D 61/185; B23D 57/0061; B24B 27/0633; B28D 5/045
See application file for complete search history.

(56) References Cited

U.S. PATENT DOCUMENTS 5,052,366 A * 10/1991 Matsukura ......... B23D 57/0061
                                                125/16.01
6,112,737 A *  9/2000 Kinutani ............ B23D 57/0053
                                                125/16.02
(Continued)

FOREIGN PATENT DOCUMENTS

| CN | 102049821 A | 5/2011 |
| CN | 202114341 U | 1/2012 |

(Continued)

OTHER PUBLICATIONS

International Search Report for corresponding application No. PCT/JP2012/006589 dated Nov. 6, 2012.

*Primary Examiner* — Christopher M Koehler
*Assistant Examiner* — Joel Crandall
(74) *Attorney, Agent, or Firm* — Knobbe, Martens, Olson & Bear, LLP

(57) ABSTRACT

A wire saw apparatus 1 executes cut-machining by pressing a workpiece W against a cutting wire 3 spirally wound around multiple wire guides 2, while running the cutting wire 3 and simultaneously swinging the wire guides 2 as well as the cutting wire 3. The wire saw apparatus 1 includes a controller 8 controlling a position of a workpiece holder 51 for holding the workpiece W. The position is controlled depending on a swing angle of the cutting wire 3 so that machined portion of the workpiece W is shaped into an arc.

11 Claims, 6 Drawing Sheets

(51) Int. Cl.
*B28D 5/04* (2006.01)
*B24B 27/06* (2006.01)

(56) References Cited

U.S. PATENT DOCUMENTS

| | | | |
|---|---|---|---|
| 6,279,564 B1* | 8/2001 | Hodsden | B23D 57/0046 125/16.01 |
| 7,387,118 B2* | 6/2008 | Komeda | B23D 57/0061 125/16.02 |
| 2003/0145707 A1* | 8/2003 | Hauser | B23D 57/0046 83/597 |

FOREIGN PATENT DOCUMENTS

| | | | |
|---|---|---|---|
| CN | 102717446 A | | 10/2012 |
| EP | 0953416 A | | 11/1999 |
| JP | 01-171753 A | | 7/1989 |
| JP | 10-272621 A | | 10/1998 |
| JP | 10-337725 A | | 12/1998 |
| JP | 11-70457 A | | 3/1999 |
| JP | 11-309660 A | | 11/1999 |
| JP | 2007-276097 A | | 10/2007 |
| JP | 2008-142842 A | | 6/2008 |
| JP | 4252193 B2 | | 1/2009 |
| JP | 2010-23145 A | | 2/2010 |
| JP | 2011-110643 A | | 6/2011 |

* cited by examiner

WIRE SAW APPARATUS AND CUT-MACHINING METHOD

CROSS-REFERENCE TO RELATED APPLICATIONS

This application is the U.S. National Phase under 35. U.S.C. § 371 of International Application PCT/JP2012/006589, filed Oct. 15, 2012. The disclosures of the above-described application are hereby incorporated by reference in their entirety.

TECHNICAL FIELD

The present disclosure relates to wire saw apparatuses and cut-machining methods for materials to be machined (hereinafter referred to as workpiece) such as silicon ingots.

BACKGROUND ART

Using a wire saw apparatus known in the art is a typical technique to slice a workpiece, such as a silicon ingot, into thin wafers. Such a wire saw apparatus slices the workpiece simultaneously at several spots on the workpiece by pressing the workpiece against a cutting wire which is spirally wound around multiple wire guides, while running the cutting wire.

Moreover, for example, a wire saw apparatus disclosed in PATENT DOCUMENT 1 carries out cut-machining on a workpiece by causing a wire guide (i.e., a workpiece roller) to run a cutting wire, and, simultaneously, causing the wire guide as well as the cutting wire to swing. Compared with a case where the cutting wire is not swung, this technique shorten the length of contact between the workpiece and the cutting wire, which can increase a cutting force to accelerate the cutting speed, and improve efficiency in ejecting swarf to achieve higher machining accuracy.

CITATION LIST

Patent Document

PATENT DOCUMENT 1: Japanese Patent Application No. H01-171753

SUMMARY OF THE INVENTION

Technical Problem

However, when the wire saw apparatus disclosed in PATENT DOCUMENT 1 presses a workpiece W against a cutting wire 102 while causing a wire guide (workpiece roller) 101 as well as a cutting wire 102 to swing as shown in illustrations (a) and (b) in FIG. 6, machined portion of the workpiece W is shaped into an approximate V. The resulting length of contact between the workpiece W and the cutting wire 102 becomes longer with an increasing diameter of a workpiece in the future. Consequently, the cutting force decreases, which slows down the cutting speed, and the swarf ejecting efficiency decreases, which causes lower machining accuracy. Furthermore, a greater swinging angle of the cutting wire 102 leads to a decrease in the cutting force, which inevitably causes the cutting wire 102 to sag. In particular, if an operator tries to accelerate the speed in cutting the workpiece W by increasing the traveling speed of a holding member, such as a table, for holding the workpiece W, the sag of the cutting wire 102 will become greater and the cutting wire 102 may be broken.

In view of the above-described problems, it is an object of the present disclosure in cut-machining by a swing wire saw apparatus to reduce the wire-breaking rate of a cutting wire as well as to accelerate a speed in cutting the workpiece.

Solution to the Problem

In order to solve the above problems, a wire saw apparatus according to the present disclosure executes cut-machining by pressing the material against a cutting wire spirally wound around a plurality of wire guides, while running the cutting wire and simultaneously swinging the plurality of the wire guides as well as the cutting wire. The wire saw apparatus includes a controller which controls a position of a holder for holding the material. The position is controlled depending on a swing angle of the cutting wire so that machined portion of the material is shaped into an arc.

In the wire saw apparatus according to the present disclosure, the position of the holder for holding the material may be controlled depending on the swing angle of the cutting wire, so that the machined portion of the material is shaped into an arc. In other words, the wire saw apparatus controls the position of the holder for holding the material, so that a direction in which the swinging cutting wire extends is always the direction of a tangent to the arc into which the machined portion of the material is shaped. This control makes it possible to carry out the cut-machining with a point contact made between the cutting wire and the material—that is, with the minimum length of contact made between the cutting wire and the material. Such control can increase a cutting force to accelerate the cutting speed, and improve a swarf-ejecting efficiency to achieve higher machining accuracy. Furthermore, the cut-machining can be carried out with a point contact made between the cutting wire and the material, so that the sag of the cutting wire is successfully curbed to be small regardless of the swing angle of the cutting wire. As a result, the wire-breaking rate of the cutting wire can be reduced.

In the wire saw apparatus according to the present disclosure, the cutting wire may swing while making a point contact with the material of which machined portion is shaped into the arc. As a result, the wire saw apparatus can obtain the above effects for sure.

In the wire saw apparatus according to the present disclosure, a relationship of $A \geq L/(2 \times \sin \theta)$ may hold, where $\theta$ is the swing angle of the cutting wire, L is the maximum cut length of the material, and A is the radius of the arc. This relationship can prevent the cutting wire and the material from making a line contact therebetween even when the swing angle of the cutting wire becomes greater.

In the wire saw apparatus according to the present disclosure, the radius of the arc may gradually decrease as the cut-machining on the material progresses, or the cutting wire does not have to be swung immediately after the start of the cut-machining on the material. Such cut-machining makes it possible to efficiently cut a material having a small cut length, such as a cylindrical material, immediately after the start of the cut-machining.

In the wire saw apparatus according to the present disclosure, a relationship of $P = P0 - ((r+A)/\cos \theta) - (r+A))$ may hold, where $\theta$ is the swing angle of the cutting wire, r is the radius of each of the wire guides, A is the radius of the arc, P0 is the reference position of the holder, and P is the control position of the holder. This relationship can achieve, as intended, the above effects when the swing center is aligned with the midpoint on the line joining the centers of the wire guides.

In the wire saw apparatus according to the present disclosure, the cutting wire may be a fixed abrasive wire. Such a wire can cut a material made of a difficult-to-cut material, such as sapphire and silicon carbide (SiC).

A cut-machining method according to the present disclosure executes cut-machining on a material to be machined, by pressing the material against a cutting wire spirally wound around a plurality of wire guides while running the cutting wire and simultaneously swinging the plurality of the wire guides as well as the cutting wire. The cut-machining method includes controlling a position of a holder for holding the material. The position is controlled depending on a swing angle of the cutting wire so that machined portion of the material is shaped into an arc.

In the cut-machining method according to the present disclosure, the position of the holder for holding the material may be controlled depending on a swing angle of the cutting wire, so that the machined portion of the material is shaped into the arc. In other words, the cut-machining method involves controlling the position of the holder for holding the material so that a direction in which the swinging cutting wire extends is always the direction of a tangent to the arc into which the machined portion of the material is shaped. This control makes it possible to carry out the cut-machining with a point contact made between the cutting wire and the material—that is, with the minimum length of contact made between the cutting wire and the material. Such control can increase a cutting force to accelerate the cutting speed, and improve a swarf-ejecting efficiency to achieve higher machining accuracy. Furthermore, the cut-machining can be carried out with a point contact made between the cutting wire and the material, so that the sag of the cutting wire is successfully curbed to be small regardless of the swing angle of the cutting wire. As a result, the wire-breaking rate of the cutting wire can be reduced.

In the cut-machining method according to the present disclosure, the cutting wire may swing while making a point contact with the material of which machined portion is shaped into the arc. As a result, the wire saw apparatus can obtain the above effects for sure.

In the cut-machining method according to the present disclosure, a relationship of $A \geq L/(2 \times \sin \theta)$ may hold, where $\theta$ is the swing angle of the cutting wire, L is a maximum cut length of the material, and A is a radius of the arc. This relationship can prevent the cutting wire and the material to be machined from making a line contact therebetween.

In the cut-machining method according to the present disclosure, the radius of the arc may gradually decrease as the cut-machining on the material progresses, or the cutting wire does not have to be swung immediately after the start of the cut-machining on the material. Such cut-machining makes it possible to efficiently cut a material to be machined having a small cut length, such as a cylindrical material, immediately after the cut-machining.

In the cut-machining method according to the present disclosure, a relationship of $P=P0-((r+A)/\cos \theta)-(r+A))$ may hold, where $\theta$ is the swing angle of the cutting wire, r is the radius of each of the wire guides, A is the radius of the arc, P0 is the reference position of the holder, and P is the control position of the holder. This relationship can obtain, for sure, the above effects when the swing center is aligned with the midpoint on the line joining the centers of the wire guides.

In the cut-machining method according to the present disclosure, the cutting wire may be a fixed abrasive wire. Such a wire can cut a material made of a difficult-to-cut material, such as sapphire and silicon carbide (SiC).

Advantages of the Invention

In cut-machining of a workpiece by a swing wire saw apparatus, a wire saw apparatus according to the present disclosure can reduce the wire-breaking rate of a cutting wire as well as to accelerate a speed in cutting the workpiece. Such a wire saw apparatus can reduce machining hours to improve productivity, while reducing machining costs.

DESCRIPTION OF EMBODIMENTS

A wire saw apparatus and a cut-machining method according to an embodiment will now be described, with reference to the drawings.

Figure 1:
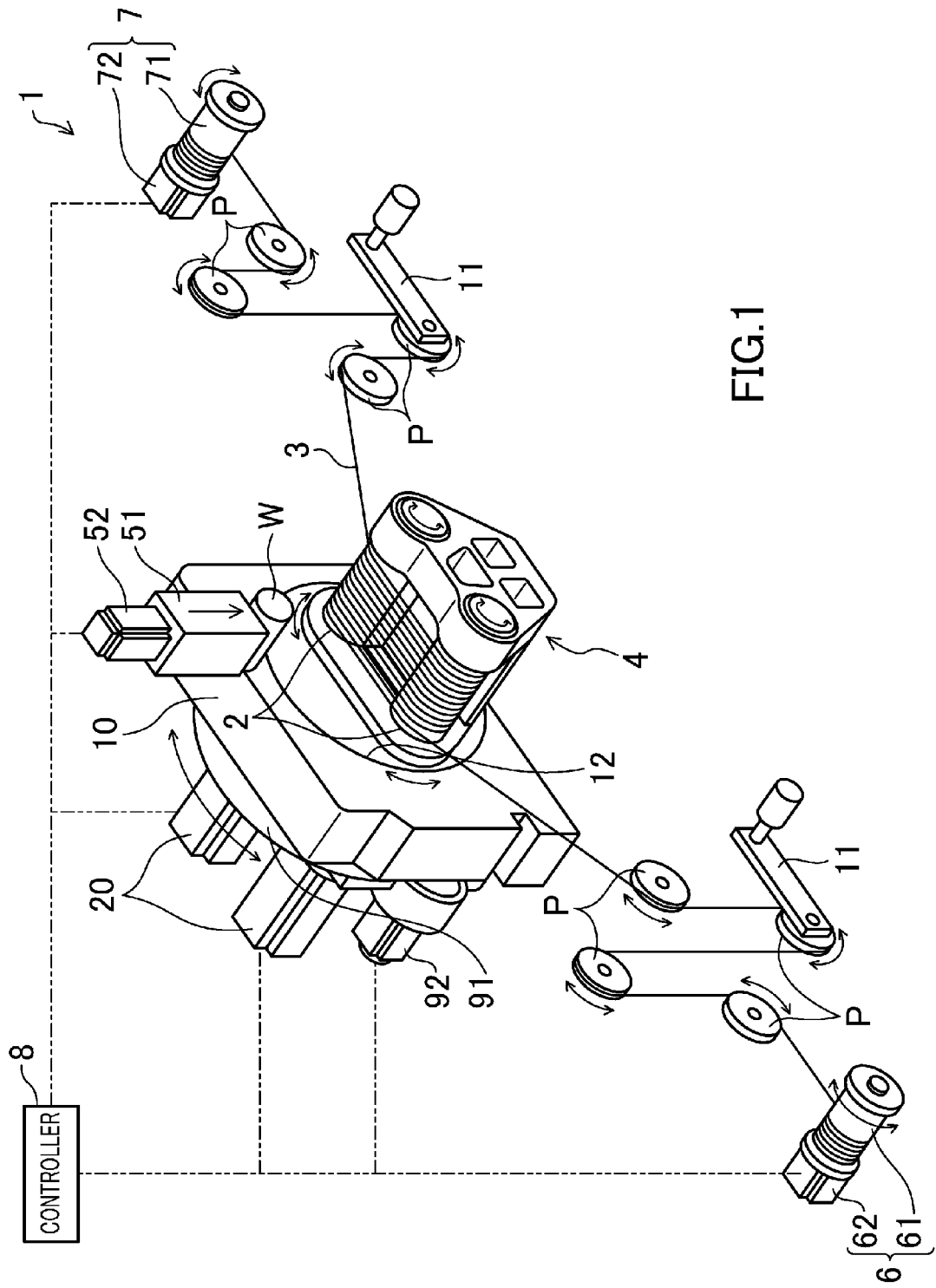
FIG. 1 is a view to illustrate an overall structure of a wire saw apparatus according to an embodiment.

FIG. 1 illustrates an overall structure of the wire saw apparatus according to the embodiment. A wire saw apparatus 1 illustrated in FIG. 1 is used for slicing a workpiece W into thin wafers simultaneously at multiple points. Here, the workpiece W is used for manufacturing, for example, semiconductor devices and solar batteries.

As illustrated in FIG. 1, the wire saw apparatus 1 includes a sidewall plate 10 having a through hole 12. In the through hole 12 on the sidewall plate 10, a swing disc 91 is rotatably engaged. The rotation shaft center of the swing disc 91 extends horizontally. To the front side of the swing disc 91 facing the sidewall plate 10, a wire guide supporter 4 is mounted. The wire guide supporter 4 is open-topped, and approximately U-shaped in the side view. To the back side of the swing disc 91 opposite to the sidewall plate 10, two wire guide driving motors 20 are mounted. The wire guide driving motors 20 are controlled by a servomotor, and each of the motors has the rotation shaft center extending horizontally. To a side of the driving motors 20 in relation to the back of the sidewall plate 10, a swing driving motor 92 is mounted. The swing driving motor 92 swings the swing disc 91. The swing driving motor 92 transmits turning force to the swing disc 91 via a not-shown timing belt, and causes the swing disc 91 to swing about the shaft center within a predetermined range of angle.

On the wire guide supporter 4, two wire guides 2 are arranged in parallel with each other and rotatably mounted. Each of the wire guides 2 has a rotating shaft connected to an output shaft of a corresponding one of the wire guide driving motors 20. When each wire guide driving motor 20 drives, a corresponding wire guide 2 rotates about its horizontal shaft center. Note that the shaft center (hereinafter referred also to as swing center) of the swing disc 91 is aligned with the midpoint on the line joining the centers (rotating axes) of the wire guides 2.

A wire (hereinafter referred to as cutting wire 3) for cutting the workpiece W is spirally wound around the wire guides 2 at predetermined pitches in the direction of the horizontal shaft centers. One end of the cutting wire 3 is placed outside of one of the wire guides 2. The one end is guided by multiple disc pulleys P and extends to a wire feeding apparatus 6. The wire feeding apparatus 6 includes a feeding bobbin 61 around which new wire segments of the cutting wire 3 are wound, and an assisting motor 62 which drives the feeding bobbin 61 to feed the cutting wire 3 to the wire guides 2. The other end of the cutting wire 3 is placed outside of the other wire guides 2. The other end is guided by the multiple disc pulleys P and extends to a wire winding apparatus 7. The wire winding apparatus 7 includes a winding bobbin 71 which winds the cutting wire 3 fed from the wire guides 2, and an assisting motor 72 which drives the winding bobbin 71. Note that, to control the tension of the cutting wire 3, a tension arm 11 is mounted on one of the disc pulleys P that are arranged outside of the wire guides 2.

The wire saw apparatus 1 according to this embodiment utilizes the drive and rotation of the wire guide driving motors 20 and the assisting motors 62 and 72 to alternately feed the cutting wire 3 and wind the cutting wire 3 in a segment shorter by a predetermined length than the fed length. This feeding and winding sequentially unreels new wire segments of the cutting wire 3 from the wire feeding apparatus 6, and feeds the unreeled segments toward the wire winding apparatus 7.

Provided above the midpoint (i.e., the swing center) on the line joining the centers (rotating axes) of the wire guides 2 is a workpiece holder 51 shaped into an approximate cuboid. The workpiece holder 51 faces the cutting wire 3 wound around the wire guides 2. At the bottom end of the workpiece holder 51, the workpiece W is held; whereas, at the top end of the workpiece holder 51, a workpiece elevating motor 52 controlled by a servomotor is mounted.

In this embodiment, when the workpiece elevating motor 52 is driven and rotated while the cutting wire 3 is running, the workpiece holder 51 is brought down by a not-shown ball screw mechanism, and the workpiece W is pressed against the cutting wire 3. Hence, the workpiece W is sliced into wafers simultaneously at multiple spots.

Furthermore, as illustrated in FIG. 1, the wire guide driving motors 20, the workpiece elevating motor 52, the assisting motors 62 and 72, and the swing driving motor 92 are connected to a controller 8 which controls these motors. The controller 8 includes devices such as a central processing unit (CPU), and a memory storing a control program. These devices are not shown in FIG. 1. The controller 8 causes the wire guide driving motors 20 and the assisting motors 62 and 72 to alternately repeat feeding and winding of the cutting wire 3, so that the motors sequentially unreel new wire segments of the cutting wire 3. In addition, the controller 8 causes the workpiece elevating motor 52 to bring the workpiece holder 51 up and down, and the swing driving motor 92 to swing the cutting wire 3 together with each of the wire guides 2.

A feature of this embodiment is that the controller 8 controls a position of the workpiece holder 51 depending on a swing angle of the cutting wire 3, so that machined portion of the workpiece W is shaped into an arc. In other words, the controller 8 controls the position of the workpiece holder 51 so that the direction in which the swinging cutting wire 3 extends is always the direction of a tangent to the arc into which the machined portion of the workpiece W is shaped. This control makes it possible to carry out cut-machining with a point contact made between the cutting wire 3 and the workpiece W—that is, with the minimum length of contact provided between the cutting wire 3 and the workpiece W. Such control can increase a cutting force to accelerate the cutting speed, and improve a swarf-ejecting efficiency to achieve higher machining accuracy. Furthermore, the cut-machining can be carried out with a point contact made between the cutting wire 3 and the workpiece W, so that the sag of the cutting wire 3 is successfully curbed to be small regardless of the swing angle of the cutting wire 3. As a result, the wire-breaking rate of the cutting wire 3 can be reduced.

Consequently, in the cut-machining by a swing wire saw apparatus, this embodiment makes it possible to reduce machining hours to improve productivity, while reducing machining costs.

Described now with reference to FIGS. 2 to 5 will be how the controller 8 controls a position of the workpiece holder 51, exemplifying the case where the shaft center (the swing center) of the swing disc 91 is aligned with the midpoint on the line joining the centers (rotating axes) of the wire guides 2.

Figure 2:
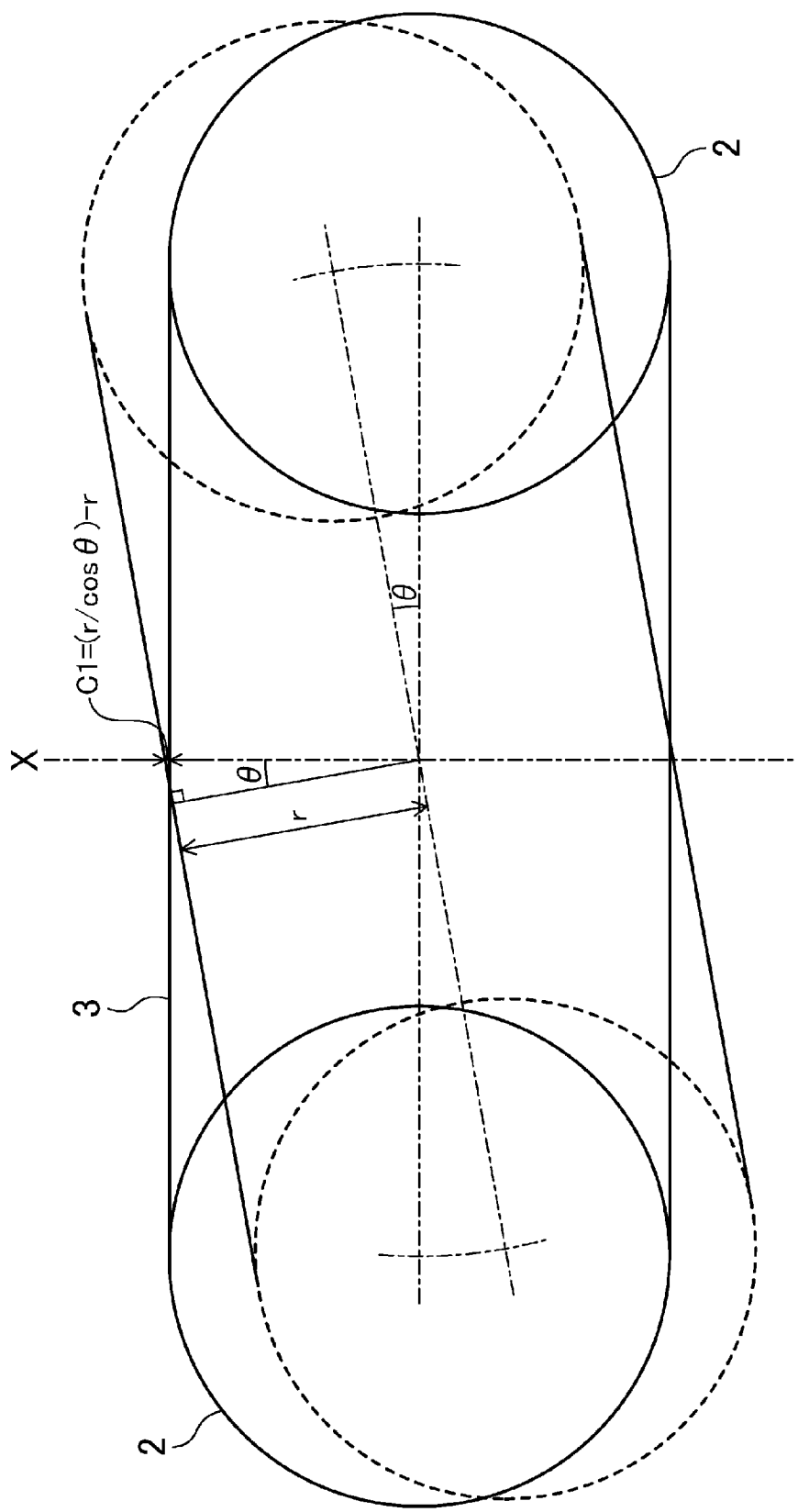
FIG. 2 is a diagram illustrating a relationship between a workpiece traveling axis X and a swing of a cutting wire in a cut-machining method according to the embodiment.

FIG. 2 is a diagram illustrating a relationship between (i) a line (hereinafter referred to as workpiece traveling axis X) joining the swing center and the middle of the workpiece W (i.e., the workpiece holder 51) and (ii) a swing of the cutting wire 3. As illustrated in FIG. 2, C1 is a point at which the workpiece moving axis X and the cutting wire 3 intersect. C1 represented as $C1=(r/\cos\theta)-r$ using the position at which the swing angle $\theta$ is 0° as the reference (0), where r is the radius of the wire guide 2, and $\theta$ is the swing angle of the cutting wire 3 (e.g., the angle formed between the line joining the centers (i.e., rotation axes) of the wire guides 2 and the horizontal direction: the same applied below).

Figure 3:
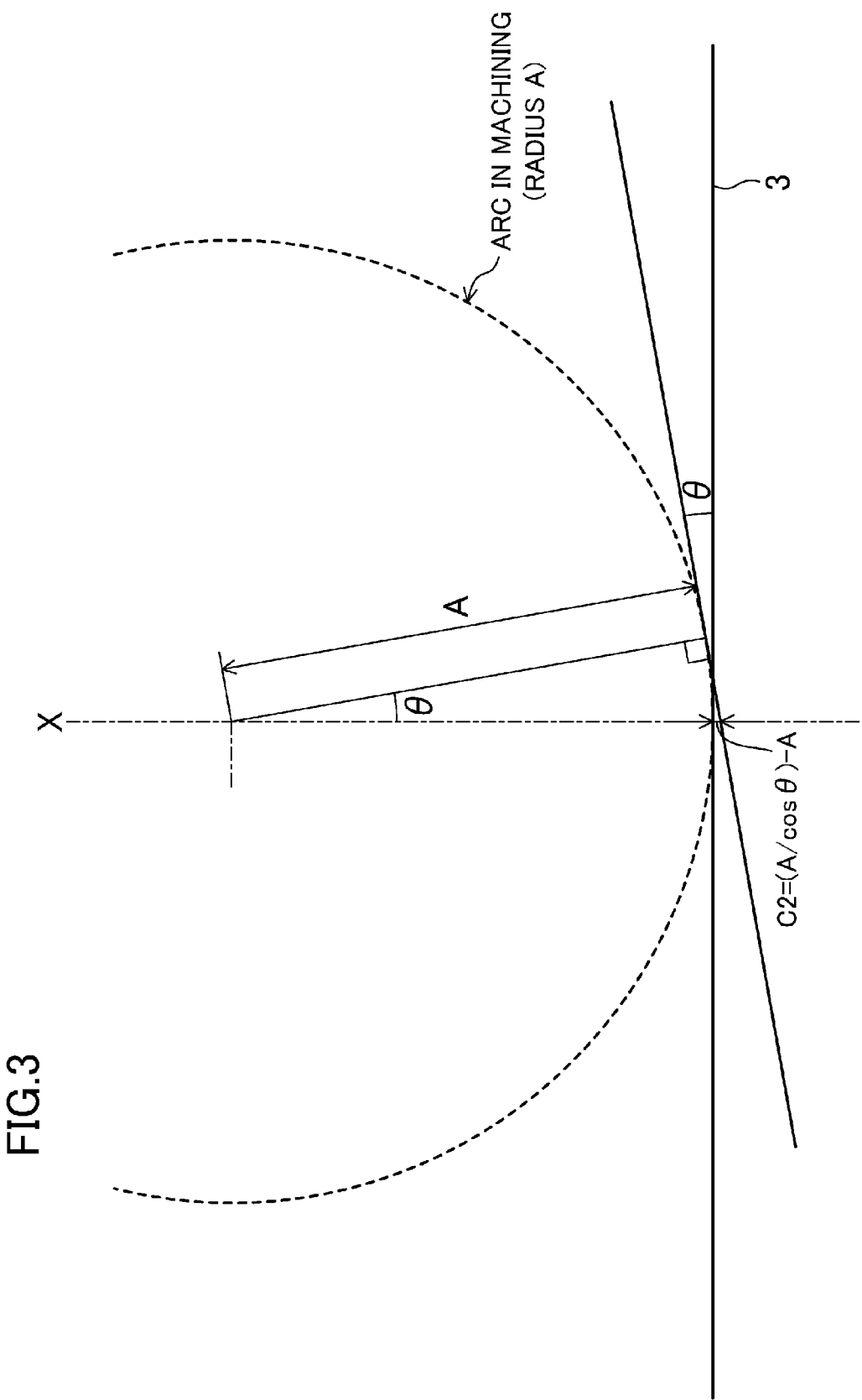
FIG. 3 is a diagram illustrating a relationship between an arc in machining and the swing of the cutting wire in the cut-machining method according to the embodiment.

FIG. 3 is a diagram illustrating a relationship between (i) an arc into which the machined portion of the workpiece W is shaped (hereinafter referred to as arc in machining) and (ii) the swing of the cutting wire 3. As illustrated in FIG. 3, C2 is a position at which the arc in machining and the cutting wire 3 make a point contact (i.e., a position in the direction of the workpiece traveling axis X). C2 is represented as $C2=(A/\cos\theta)-A$ using the position at which the swing angle $\theta$ is 0° as the reference (0), where A is the radius of the arc in machining.

Hence, P0 is the reference position of the workpiece holder 51, and P is the control position, of the workpiece holder 51, obtained by adding a deviation amount to the reference position P0 so that the machined portion of the workpiece W is shaped into an arc. P and P0 are represented as follows:

$$P = P0 - C1 - C2;$$
$$= P0 - ((r/\cos\theta) - r) - ((A/\cos\theta) - A); \text{ and}$$
$$= P0 - ((r+A)/\cos\theta) - (r+A)).$$

Here, when the workpiece holder 51 is assumed to descend at a constant speed of, for example, V0 in the case where the position control of the workpiece holder 51 according to this embodiment is not executed, the reference position P0 is represented as $P0=V0\times t$ where t is a machining time. Note that in the case of the wire saw apparatus 1 illustrated in FIG. 1, a downward direction is the forward direction for the reference position P0, the control position P and the speed V0.

Figure 4:
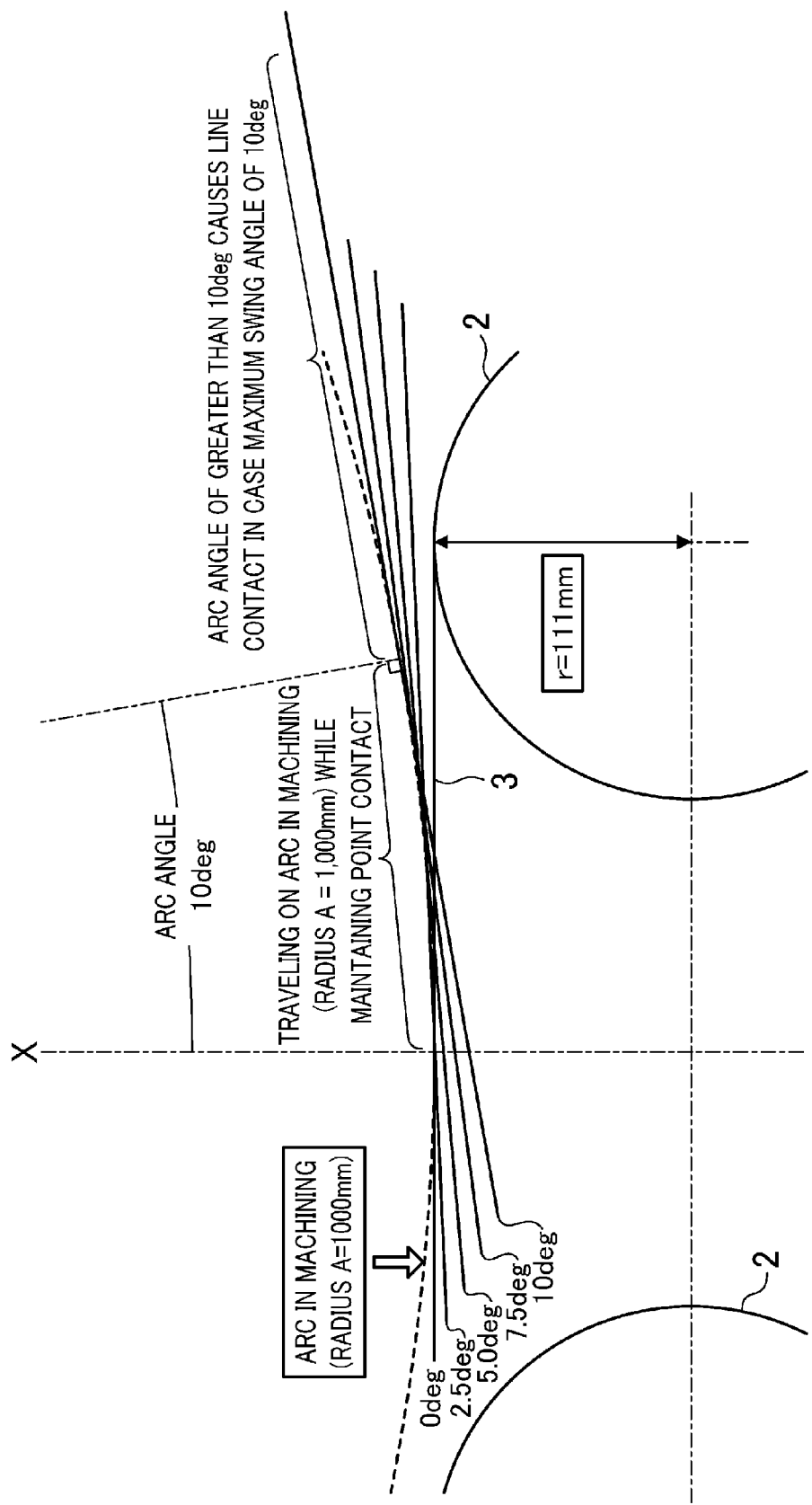
FIG. 4 is a diagram schematically illustrating how a contacting state between the cutting wire and the arc in machining changes in association with a change in swing angle in the cut-machining method according to the embodiment.

FIG. 4 schematically illustrates how a state of contact between the cutting wire 3 and the arc in machining changes in association with a change in the swing angle θ, in the case where the position control of the workpiece holder 51 according to this embodiment is executed when each of the wire guides 2 has a radius r of 111 mm and the arc in machining has a radius A of 1,000 mm. FIG. 4 shows that if an arc angle (i.e., an angle formed between the workpiece traveling axis X and a direction of a normal to the cutting wire 3) exceeds 10° in the case where the maximum swing angle θ is, for example, 10°, the cutting wire 3 and the workpiece W will make a line contact. Thus, in order to maintain the state in which the cutting wire 3 and the workpiece W make a point contact even though the swing angle θ becomes greater, A≥L/(2×sin θ) needs to hold for the radius A of the arc in machining, where L is the maximum cut length of the workpiece W (i.e., the maximum dimension of the workpiece W in the direction of the normal to the workpiece traveling axis X in this embodiment).

Figure 5:
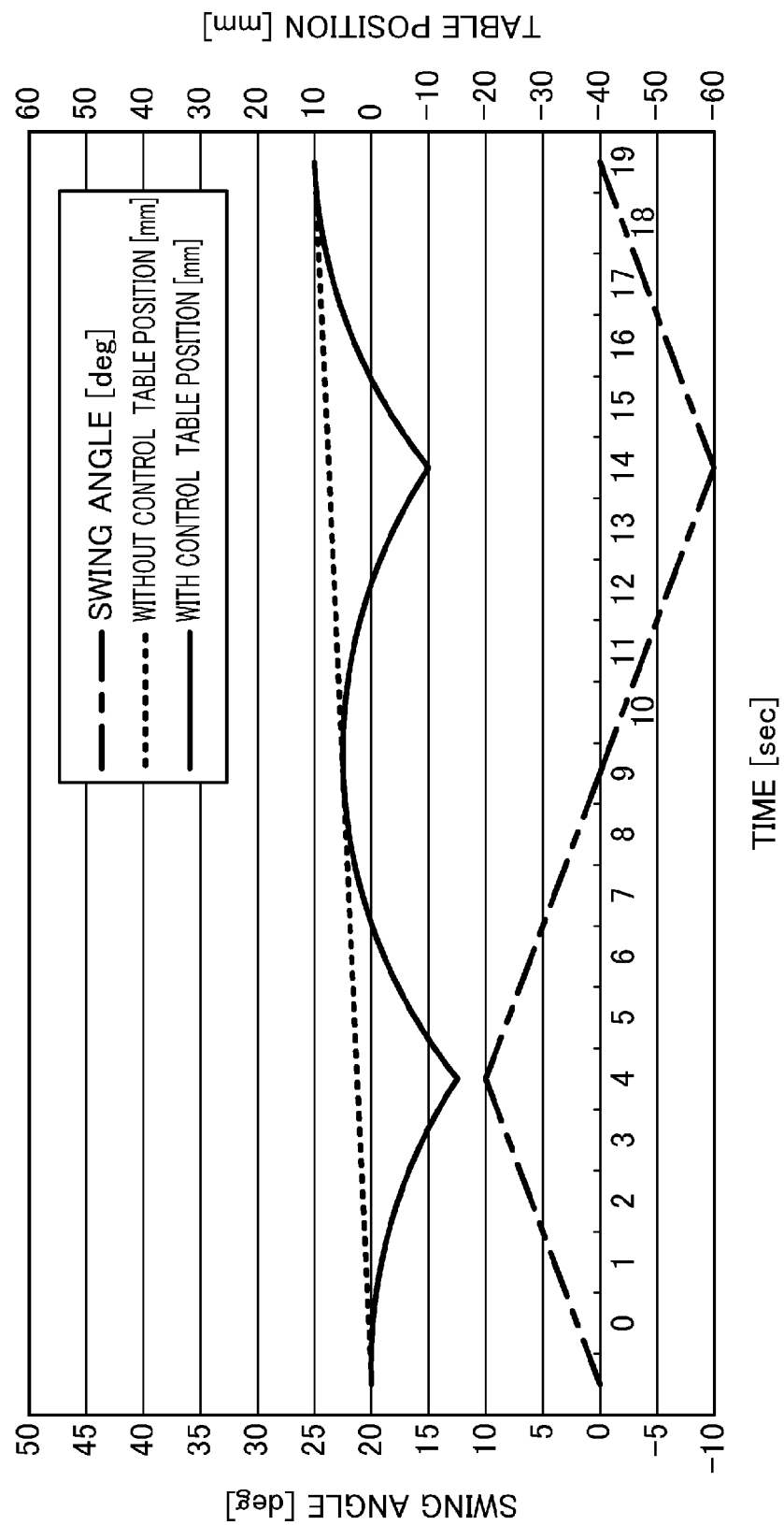
FIG. 5 is a graph exemplifying a temporal change in the swing angle and a position of a table in the cut-machining method according to the embodiment.
Figure 6:
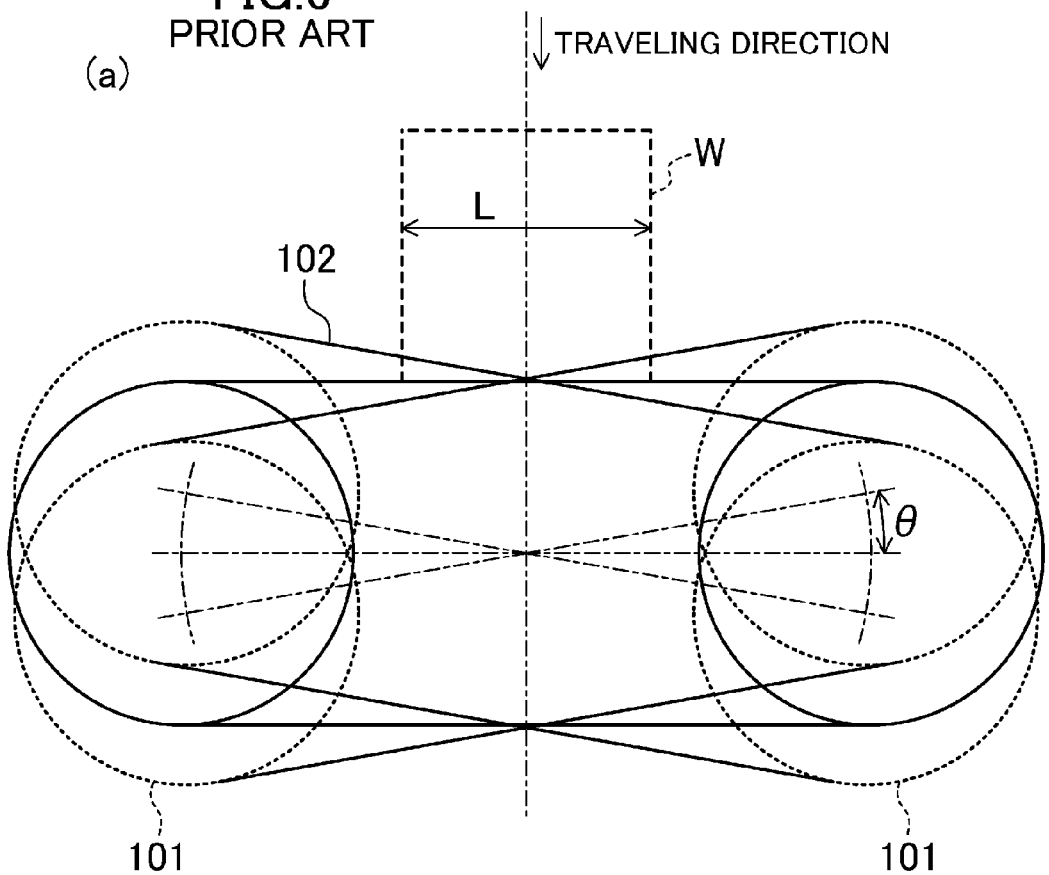
FIG. 6 shows in an illustration (a) a problem of a conventional wire saw apparatus, and in an illustration (b) an enlarged view of a substantial part of the illustration (a).
Figure 6:
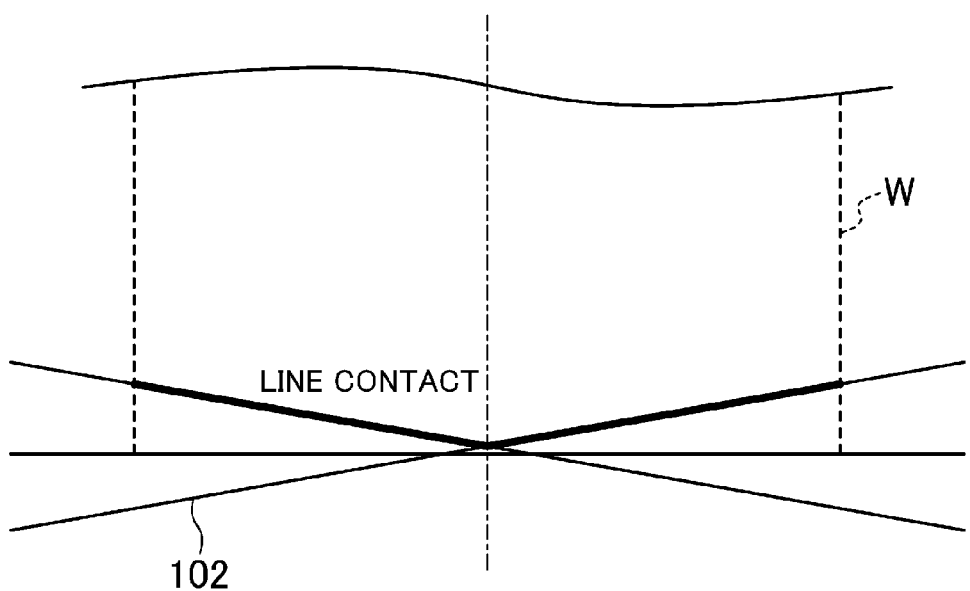

FIG. 5 shows an example of temporal changes in the swing angle θ and a position of the workpiece holder 51 (i.e., a position of the table in FIG. 5), in the case where the position control of the workpiece holder 51 in this embodiment is executed when each of the wire guides 2 has a radius of 111 mm and the arc in machining has the radius A of 1,000 mm. As a comparative example, FIG. 5 also illustrates a temporal change in a table position when the position control of the workpiece holder 51 according to this embodiment is not executed. FIG. 5 shows that, in the comparative example, the table position monotonically changes (i.e., the workpiece holder 51 descends at a constant speed); whereas, in this embodiment, the table position is finely controlled (i.e., the workpiece holder 51 is brought up and down) depending on the swing angle θ. Compared with a wafer obtained by the cut-machining in the comparative example, a wafer obtained by the cut-machining according to this embodiment achieved improvements in warp precision by approximately 60% and surface roughness by approximately 30%. Moreover, compared with the cut-machining in the comparative example, the cut-machining in this embodiment achieved a decrease in the wire-breaking rate of the cutting wire 3 by approximately 30%.

Note that a wire saw apparatus to which the present disclosure is applicable shall not be limited to the wire saw apparatus 1 illustrated in FIG. 1. The present disclosure is widely applicable to any type of wire saw apparatus which executes cut-machining by pressing a material to be machined against a cutting wire spirally wound around multiple wire guides, while running the cutting wire and simultaneously swinging the wire guides as well as the cutting wire. For example, two wire guides 2 are provided to the wire saw apparatus 1 illustrated in FIG. 1. The present disclosure is also applicable to a wire saw apparatus including three or more wire guides. In addition, the wire saw apparatus 1 illustrated in FIG. 1 may execute cut-machining, while supplying slurry containing abrasive grains to the cutting wire.

Furthermore, in the wire saw apparatus 1 illustrated in FIG. 1, the shaft center (i.e., the swing center) of the swing disc 91 is aligned with the midpoint on the line joining the centers (rotating axes) of the wire guides 2; however, the location of the swing center does not have to be limited. For example, the swing center may be located at any given point on the workpiece traveling axis X. Note that the formula for calculating the control position P of the workpiece holder 51 needs to be modified depending on the location of the swing center. Moreover, in this embodiment, the reference position P0 of the workpiece holder 51 is set on the assumption that the workpiece holder 51 is descending at a constant speed; however, the setting method of the reference position P0 does not have to be limited. The reference position P0 may be set on the assumption that, for example, the speed of the workpiece holder 51 is changing in stages depending on the progress of the cut-machining executed on the workpiece W.

In addition, the shape (i.e., the shape before machining) of the workpiece W to which the present disclosure is applicable does not have to be limited. The present disclosure is widely applicable to the workpiece W having various shapes such as a cylinder and a cuboid. Here, to efficiently cut a workpiece W having a small cut length (i.e., the dimension of the workpiece W in the direction of the normal to the workpiece traveling axis X in this embodiment) the radius A of the arc in machining may gradually decreases as the cut-machining on the workpiece W progresses, so that, for example, a material is efficiently cut when the material has a small cut length immediately after the cut-machining starts, such as a cylindrical material. Alternatively, the cutting wire does not have to be swung immediately after the start of the cut-machining on the workpiece W. Furthermore, the material of the workpiece W does not have to be limited to, for example, silicon, in particular; however, if the workpiece W is made of a difficult-to-cut material such as sapphire and silicon carbide (SiC), for example, the cutting wire for use is preferably a fixed abrasive wire. When the fixed abrasive wire is used as the cutting wire, the cut-machining may be executed with cooling water being supplied to the cutting wire, instead of slurry containing abrasive grains.

INDUSTRIAL APPLICABILITY

The wire saw apparatuses according to the present disclosure is suitable for use in a wire saw apparatus and a cut-machining method for cutting materials to be machined, such as silicon ingots.

DESCRIPTION OF REFERENCE CHARACTERS

1 Wire Saw Apparatus
2 Wire Guide
3 Cutting Wire
4 Wire Guide Supporter
6 Wire Feeding Apparatus
7 Wire Winding Apparatus
8 Controller
10 Sidewall Plate
11 Tension Arm
12 Through Hole
20 Wire Guide Driving Motor
51 Workpiece Holder
52 Workpiece Elevating Motor
61 Feeding Bobbin
62 Assisting Motor
71 Winding Bobbin
72 Assisting Motor
91 Swing Disc
92 Swing Driving Motor
P Pulley
W Workpiece

What is claimed is:

1. A wire saw apparatus comprising:
   a cutting wire spirally wound around a plurality of wire guides and executing cut-machining on a material while the cutting wire is running; and
   a controller configured to control a position of a holder for holding the material, the position being controlled depending on a swing angle of the cutting wire so that machined portion of the material is shaped into an arc, wherein the cutting wire swings while making a point contact with the material of which machined portion is shaped into the arc, and $$A \geq L/(2 \times \sin \theta_{max})$$

where $\theta_{max}$ is the greatest swing angle of the cutting wire, L is a maximum cut length of the material, and A is a radius of the arc,
   wherein the controller is configured to control the position of a holder for holding the material such that as the swing angle increases, the position of the holder is moving apart from a reference position and as the swing angle decreases, the position of the holder is moving closer to the reference position.

2. The wire saw apparatus of claim 1, wherein the arc has a radius which gradually decreases as the cut-machining on the material progresses.

3. The wire saw apparatus of claim 1, wherein the cutting wire is swung a distinct amount of time after a start of the cut-machining on the material.

4. The wire saw apparatus of claim 1, wherein the controller is configured to control a position of a holder to satisfy following equation, $$P = P0 - ((r+A)/\cos \theta) - (r+A)),$$

where $\theta$ is the swing angle of the cutting wire, r is a radius of each wire guide, A is a radius of the arc, P0 is a reference position of the holder, and P is a control position of the holder.

5. The wire saw apparatus of claim 1, wherein the cutting wire is a fixed abrasive wire.

6. A cut-machining method for executing cut-machining on a material to be machined, the cut-machining method comprising:
   pressing the material against a cutting wire spirally wound around a plurality of wire guides while running the cutting wire and simultaneously swinging the plurality of the wire guides as well as the cutting wire; and
   controlling a position of a holder for holding the material, the position being controlled depending on a swing angle of the cutting wire so that machined portion of the material is shaped into an arc, wherein the cutting wire swings while making a point contact with the material of which machined portion is shaped into the arc, and
   wherein the position of a holder for holding the material is controlled depending on a swing angle of the cutting wire such that as the swing angle increases, the position of the holder is moving apart from a reference position and as the swing angle decreases, the position of the holder is moving closer to the reference position, and $$A \geq L/(2 \times \sin \theta_{max}),$$

where $\theta_{max}$ is the greatest swing angle of the cutting wire, L is a maximum cut length of the material, and A is a radius of the arc.

7. The cut-machining method of claim 6, wherein the arc has a radius which gradually decreases as the cut-machining on the material progresses.

8. The cut-machining method of claim 6 further comprising pressing the material against the cutting wire without swinging the cutting wire before pressing the material against the cutting wire while simultaneously swinging the plurality of the wire guides as well as the cutting wire.

9. The cut-machining method of claim 6, wherein in the controlling, a position of the material is controlled to satisfy following equation, $$P = P0 - ((r+A)/\cos \theta) - (r+A)),$$

where $\theta$ is the swing angle of the cutting wire, r is a radius of each wire guide, A is a radius of the arc, P0 is a reference position of the holder, and P is a control position of the holder.

10. The cut-machining method of claim 6, wherein the cutting wire is a fixed abrasive wire.

11. A cut-machining method for executing cut-machining on a material to be machined, the cut-machining method comprising:
    pressing the material against a cutting wire spirally wound around a plurality of wire guides while running the cutting wire and simultaneously swinging the plurality of the wire guides as well as the cutting wire; and
    controlling a position of a holder for holding the material, the position being controlled depending on a swing angle of the cutting wire so that machined portion of the material is shaped into an arc, wherein the cutting wire swings while making a point contact with the material of which machined portion is shaped into the arc,
    wherein following equation, in the controlling, a position of the material is controlled to satisfy following equation, $$P = P0 - ((r+A)/\cos \theta) - (r+A)),$$

where $\theta$ is the swing angle of the cutting wire, r is a radius of each wire guide, A is a radius of the arc, P0 is a reference position of the holder, and P is a control position of the holder.

* * * * *

UNITED STATES PATENT AND TRADEMARK OFFICE
CERTIFICATE OF CORRECTION

| | |
|---|---|
| PATENT NO. | : 9,969,017 B2 |
| APPLICATION NO. | : 14/435721 |
| DATED | : May 15, 2018 |
| INVENTOR(S) | : Imakurusu et al. |

Page 1 of 1

It is certified that error appears in the above-identified patent and that said Letters Patent is hereby corrected as shown below:

In the Specification

In Column 1, Line 59, change "swarf ejecting" to --swarf-ejecting--.

In Column 6, Line 59 (Approx.), change "r/cosθ" to --r/cos θ--.

In Column 6, Line 59 (Approx.), change "A/cosθ" to --A/cos θ--.

In Column 6, Line 60 (Approx.), change "cosθ" to --cos θ--.

In the Claims

In Column 9, Line 32 (Approx.), in Claim 4, after "satisfy" insert --the--.

In Column 10, Line 22 (Approx.), in Claim 9, after "satisfy" insert --the--.

In Column 10, Line 43 (Approx.), Claim 11, after "wherein" delete "following equation,".

In Column 10, Lines 44-45 (Approx.), Claim 11, after "satisfy" insert --the--.

Signed and Sealed this
Twelfth Day of February, 2019

Andrei Iancu
*Director of the United States Patent and Trademark Office*